(12) United States Patent
Aoyama

(10) Patent No.: US 9,885,427 B2
(45) Date of Patent: Feb. 6, 2018

(54) MANUAL OPENING/CLOSING VALVE

(71) Applicant: CKD CORPORATION, Komaki-shi, Aichi (JP)

(72) Inventor: Tatsuhito Aoyama, Kasugai (JP)

(73) Assignee: CKD CORPORATION, Komaki (JP)

( * ) Notice: Subject to any disclaimer, the term of this patent is extended or adjusted under 35 U.S.C. 154(b) by 148 days.

(21) Appl. No.: 14/713,391

(22) Filed: May 15, 2015

(65) Prior Publication Data
US 2015/0354723 A1 Dec. 10, 2015

(30) Foreign Application Priority Data
Jun. 6, 2014 (JP) ................................ 2014-117865

(51) Int. Cl.
*F16K 35/02* (2006.01)
*F16K 31/50* (2006.01)
*F16K 7/16* (2006.01)

(52) U.S. Cl.
CPC .............. *F16K 35/025* (2013.01); *F16K 7/16* (2013.01); *F16K 31/508* (2013.01)

(58) Field of Classification Search
CPC ......... F16K 35/025; F16K 7/16; F16K 31/508
See application file for complete search history.

(56) References Cited

U.S. PATENT DOCUMENTS

| 1,369,444 | A | * | 2/1921 | Koplin | ................... F16K 15/18 251/82 |
| 2,091,874 | A | * | 8/1937 | Neuhaus | ................... F16K 1/38 116/277 |
| 3,053,500 | A | * | 9/1962 | Atkinson | ............ F04B 53/1025 137/543.23 |
| 2008/0173834 | A1 | * | 7/2008 | Aoyama | ................... F16K 7/16 251/89 |

FOREIGN PATENT DOCUMENTS

| JP | H09-264451 A | 10/1997 |
| JP | 2005-291380 A | 10/2005 |
| JP | 2010-014128 A | 1/2010 |
| KR | 2007/0116064 A | 12/2007 |

OTHER PUBLICATIONS

Jun. 10, 2016 Office Action issued in Korean Patent Application No. 10-2015-0078535.

* cited by examiner

*Primary Examiner* — Jessica Cahill
*Assistant Examiner* — Daphne M Barry
(74) *Attorney, Agent, or Firm* — Oliff PLC

(57) ABSTRACT

A manual opening/closing valve includes a manual handle, a valve element, a valve seat, an input port, and an output port. The manual opening/closing valve is arranged to move the valve element into contact with the valve seat when the manual handle is rotated, so that the valve is placed in a cutoff state in which communication between the input port and the output port is cut off, wherein the cutoff state includes a first cutoff state established when the manual handle is rotated to a first angle and a second cutoff state established when the manual handle is rotated to a second angle at which rotation operation force to the manual handle is converted to a cutoff load to be applied to the valve seat.

7 Claims, 10 Drawing Sheets

MANUAL OPENING/CLOSING VALVE

CROSS-REFERENCE TO RELATED APPLICATIONS

This application is based upon and claims the benefit of priority from the prior Japanese Patent Application No. 2014-117865 filed on Jun. 6, 2014, the entire contents of which are incorporated herein by reference.

BACKGROUND OF THE INVENTION

Field of the Invention

The present invention relates to a manual opening/closing valve configured such that a valve element is moved into contact with a valve seat by rotation of a manual handle, thereby cutting off communication between an input port and an output port.

Related Art

In a production process of semiconductors, a manual opening/closing valve to allow an operator to reliably cut off gas supply by manual operation is widely used for equipment or facilities of supplying process gas, etc. For example, the manual opening/closing valve is used when it is necessary to stop supplying process gas during normal operation or to avoid flowing process gas during maintenance in which pipes and others are removed or disconnected from the equipment.

Patent Document 1 discloses a fluid control device having a mechanism of moving a valve element in a direction toward a valve seat by a screw structure when a manual handle is rotated and a structure of urging an urging spring in a direction to bring the valve element into contact with the valve seat.

The process gas to be used in the above device is highly corrosive. Thus, the valve seat is made of resin such as trifluoroethylene, etc. In order to prevent large deformation of the valve seat even when an operator rotates the manual handle too much, the above device is configured to make the valve element contact with the valve seat by only the force of the urging spring.

Patent Document 2 discloses that a padlock is attached to a manual handle to lock this handle in order to keep the manual opening/closing valve in a closed state during maintenance for the safety of the operator.

RELATED ART DOCUMENTS

Patent Documents

Patent Document 1: JP-A-9(1997)-264451
Patent Document 2: JP-A-2005-291380

SUMMARY OF INVENTION

Problems to be Solved by the Invention

The above-described conventional manual opening/closing valves cause the following disadvantages. Specifically, there is a case that initial pressure of a gas cylinder operative as a supply source that stores process gas is as high as more than 20 MPa. Therefore, during maintenance, even when a regulator located downstream of the gas cylinder is broken and the manual opening/closing valve is directly subjected to the maximum pressure of the process gas, the manual opening/closing valve is required to prevent gas leakage for the safety of the operator.

However, in the manual opening/closing valve of the Patent Document 1, when the regulator downstream of the gas cylinder is broken and the process gas in the gas cylinder directly flows into the manual opening/closing valve, gas leak may occur because the valve element is urged to seat on the valve seat by only an urging means such as the spring.

Moreover, during normal operation if the manual handle is rotated even a little when someone touches the manual handle, there is a risk that a small amount of gas may leak.

The present invention has been made to solve the above problems and has a purpose to provide a manual opening/closing valve configured to prevent gas leakage in case that the manual opening/closing valve is directly subjected to the maximum gas pressure of the gas cylinder during maintenance.

Means of Solving the Problems

To achieve the above purpose, one aspect of the invention provides a manual opening/closing valve including: a manual handle; a valve element; a valve seat; an input port; and an output port. The manual opening/closing valve is arranged to move the valve element into contact with the valve seat when the manual handle is rotated, so that the valve is placed in a cutoff state in which communication between the input port and the output port is cut off, wherein the cut state includes a first cutoff state established when the manual handle is rotated to a first angle and a second cutoff state established when the manual handle is rotated to a second angle at which rotation operation force to the manual handle is converted to a cutoff load to be applied to the valve seat.

The above manual opening/closing valve can provide the following operations and effects. Rotating the manual handle to the first angle places the manual valve in a cutoff state quickly, and further rotating the manual handle to the second angle applies a cutoff load converted from the rotating operation force of the manual handle to the valve seat. Therefore, the rotation angle contributing to the cutoff state provide ranges and enables selection of a cutoff state with a higher load, so that it is possible to reliably cutoff the fluid.

DESCRIPTION OF EMBODIMENTS

A detailed description of a preferred embodiment of a manual opening/closing valve 1 according to the present invention will now be given referring to the accompanying drawings. The manual opening/closing valve 1 is, for example, used in a line to supply process gas in a production process of semiconductors.

Figure 1:
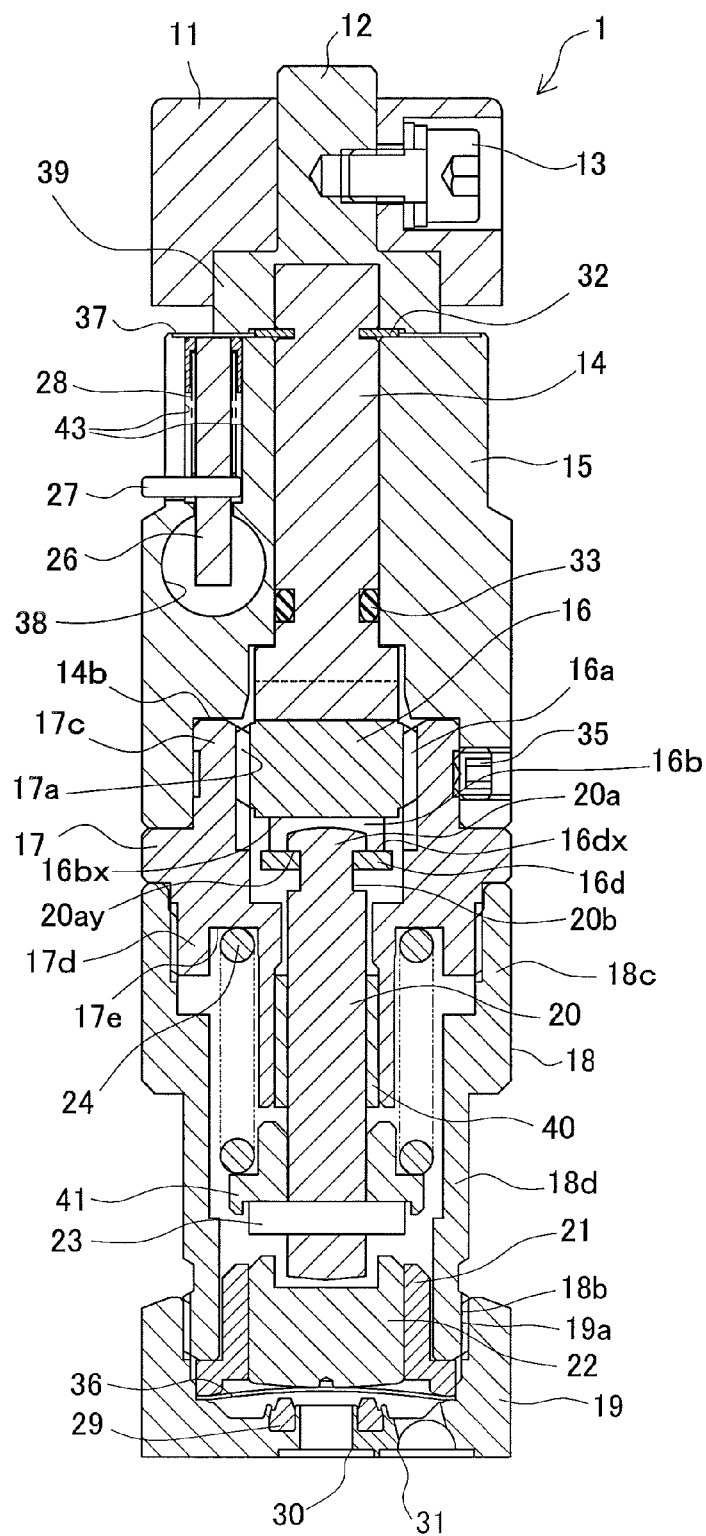
FIG. 1 is a sectional view of the manual opening/closing valve in an open valve state.
Figure 2:
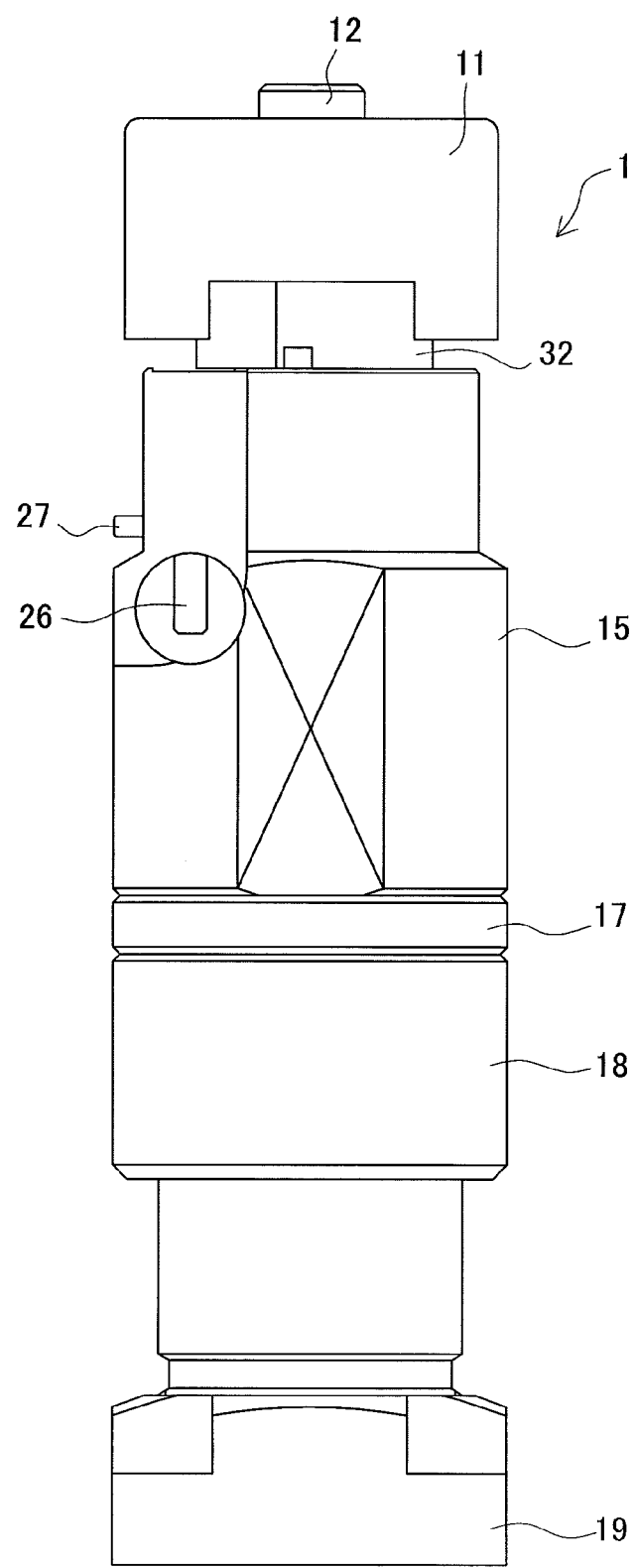
FIG. 2 is a front view of the manual opening/closing valve in an open valve state.
Figure 3:
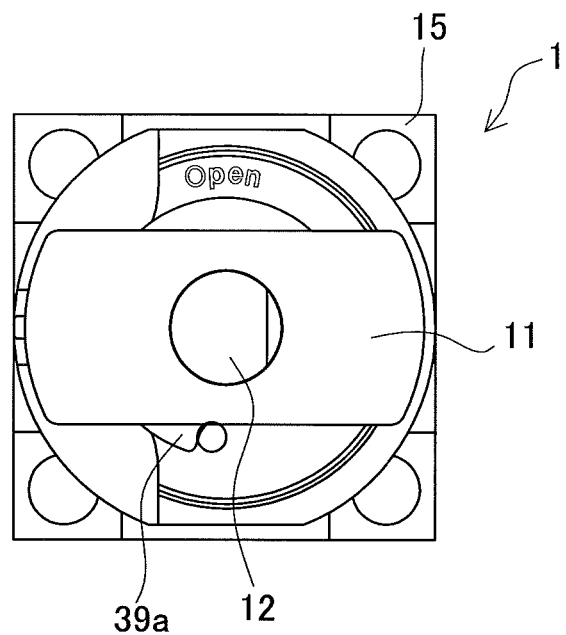
FIG. 3 is a plane view of the manual opening/closing valve in an open valve state.

FIG. 2 is a front view of the manual opening/closing valve 1, FIG. 1 is a front sectional view, and FIG. 3 is a plane view. FIGS. 1, 2, and 3 show an open valve state of the valve 1.

Figure 4:
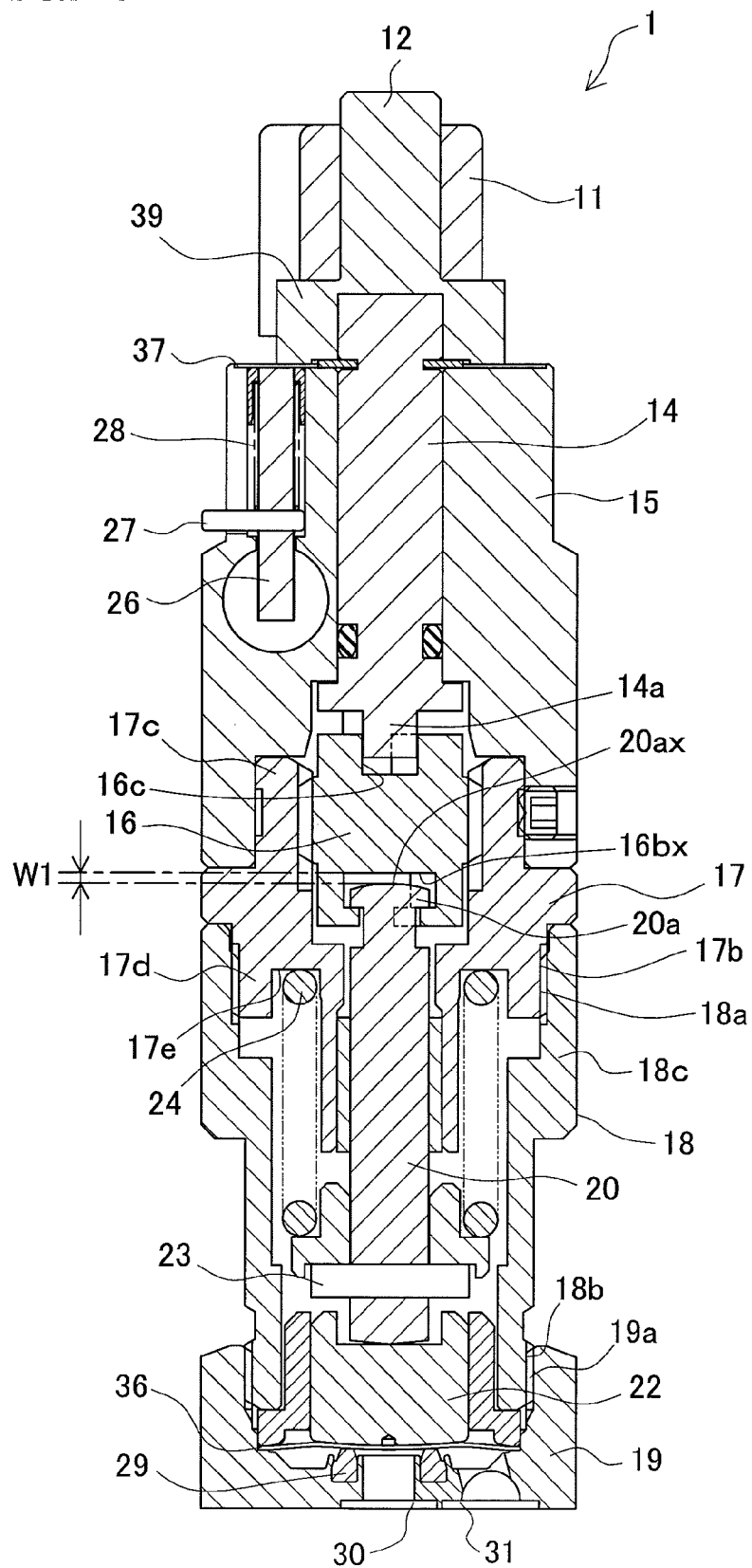
FIG. 4 is a sectional view of the manual opening/closing valve with a handle positioned at a first angle.
Figure 5:
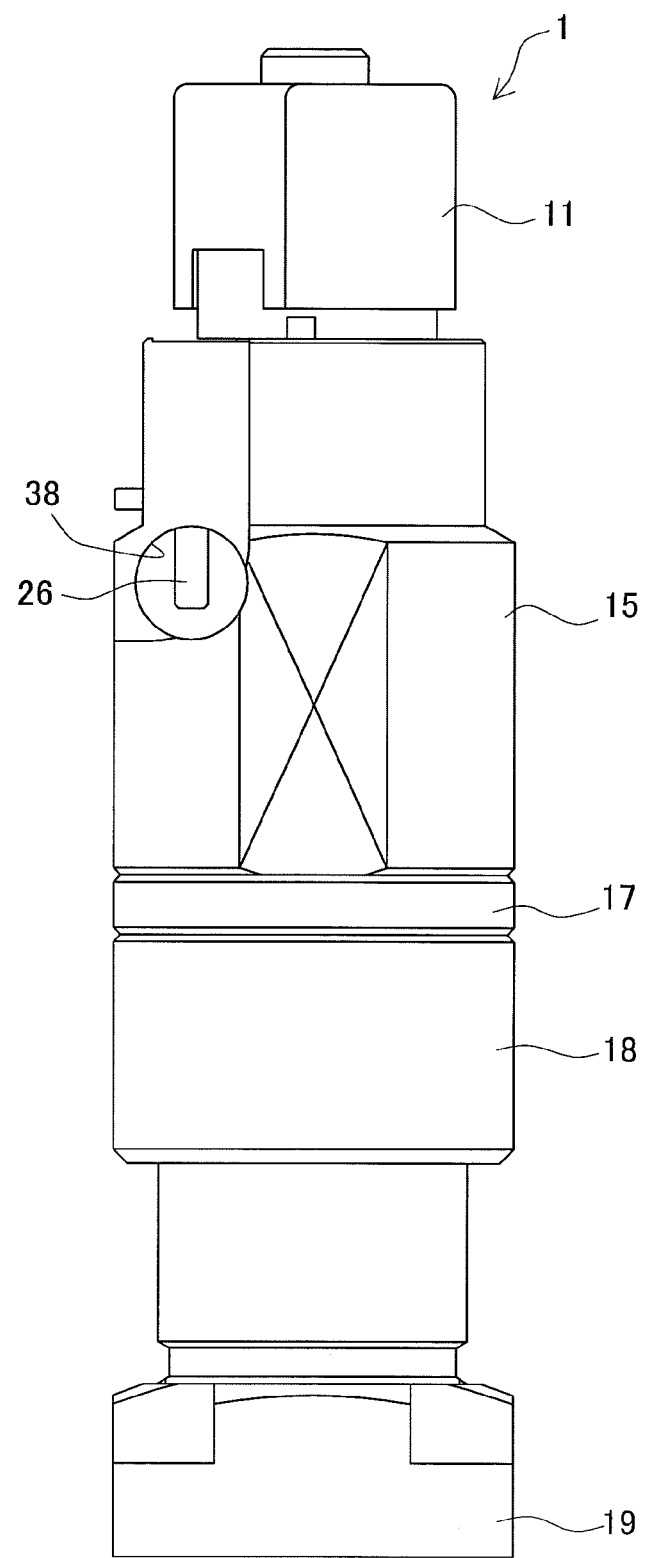
FIG. 5 is a front view of the manual opening/closing valve with the handle positioned at the first angle.
Figure 6:
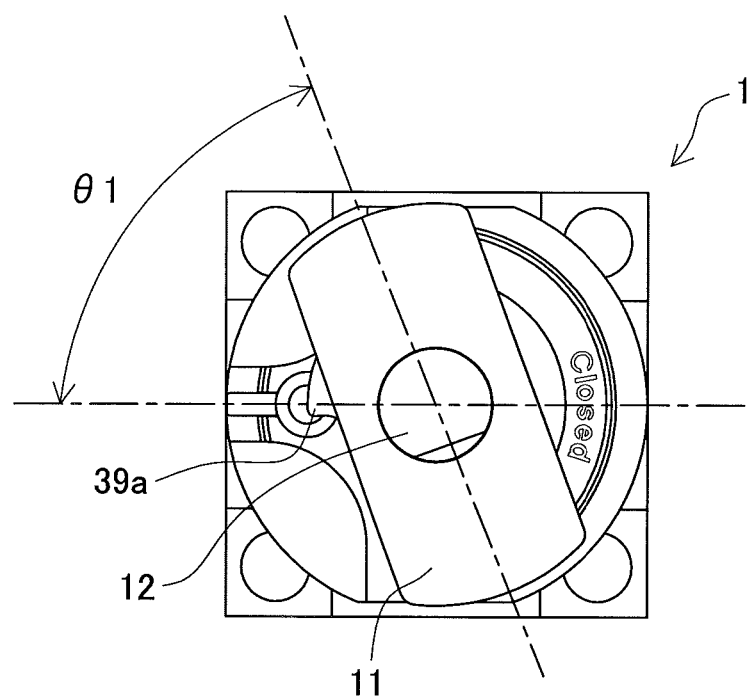
FIG. 6 is a plane view of the manual opening/closing valve with the handle positioned at the first angle.

FIG. 5 is a front view of the manual opening/closing valve 1, FIG. 4 is a front sectional view, and FIG. 6 is a plane view. FIGS. 4, 5, and 6 show the valve 1 with a manual handle 11 rotated clockwise to only a first angle θ1=70 degrees as shown in FIG. 6 from the open valve state shown in FIG. 3.

Figure 7:
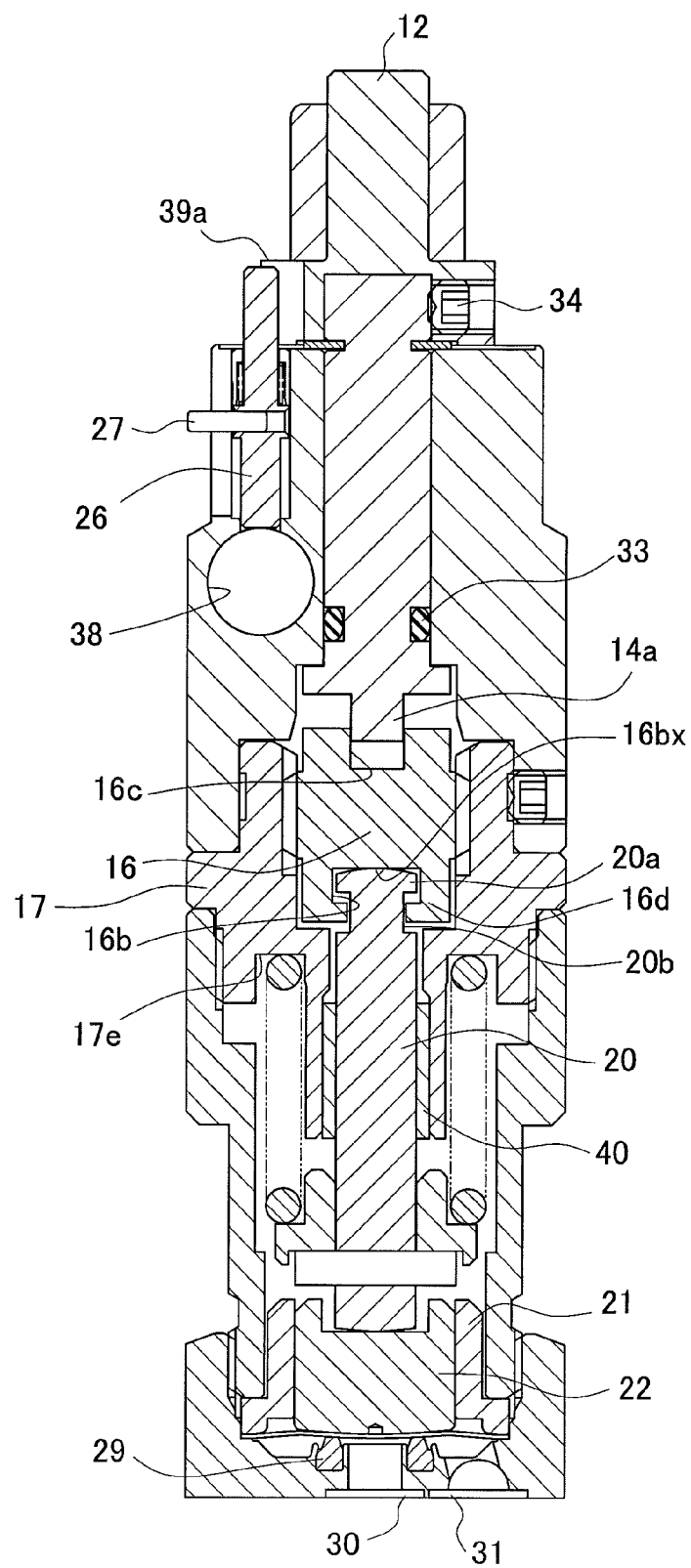
FIG. 7 is a cross sectional view of the manual opening/closing valve with the handle positioned at a second angle.
Figure 8:
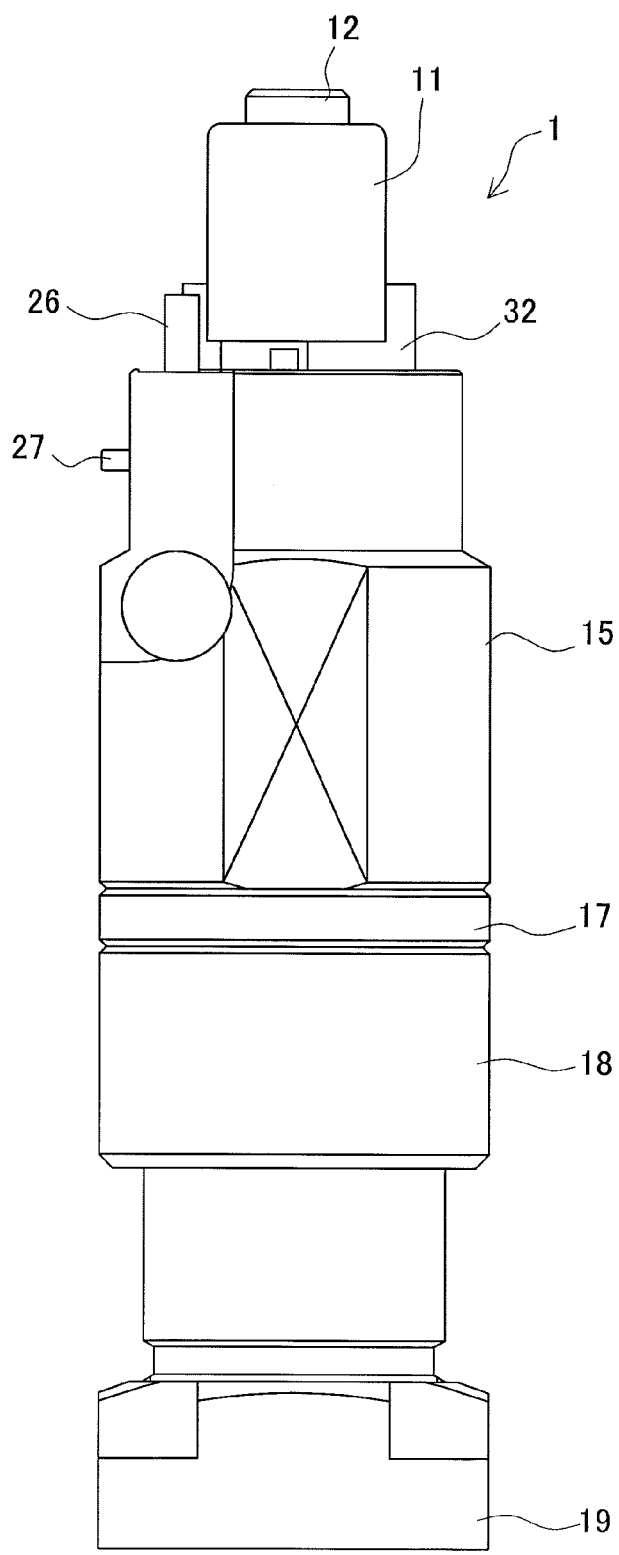
FIG. 8 is a front view of the manual opening/closing valve with the handle positioned at the second angle.
Figure 9:
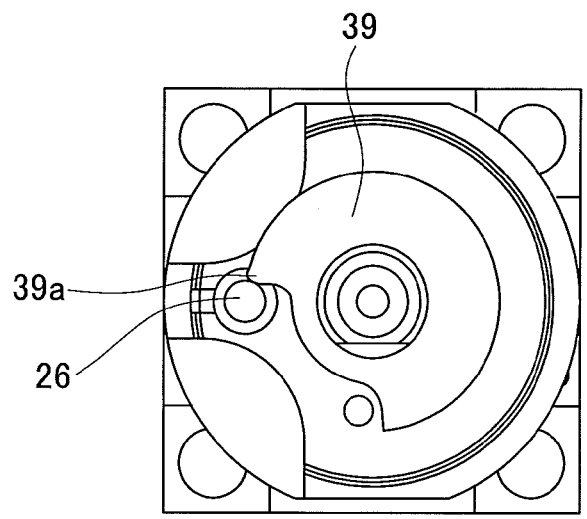
FIG. 9 is a plane view of the manual opening/closing valve in which the handle is positioned at the second angle, but is omitted.
Figure 10:
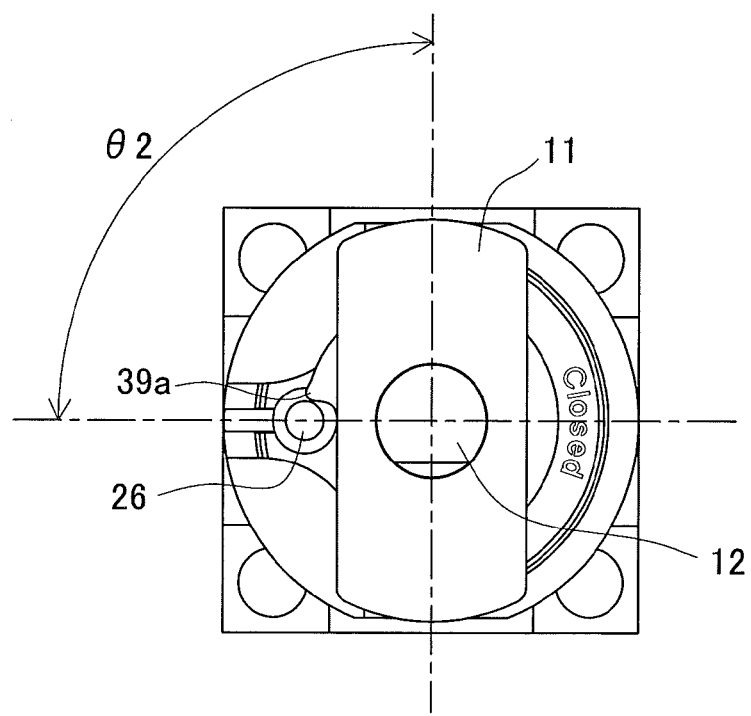
FIG. 10 is a plane view of the manual opening/closing valve the handle positioned at the second angle.

FIG. 8 is a front view of the manual opening/closing valve 1, FIG. 7 is a front sectional view, and FIGS. 9 and 10 are plane views. It is to be noted that FIG. 9 shows the valve 1 from which the handle 11 is removed. FIGS. 7-10 show the valve 1 with the manual handle 11 further rotated clockwise to only the second angle θ2=90 degrees from the open valve state as shown in FIG. 10.

As shown in FIG. 1, the valve 1 has a valve main body including, from top, a first main body 15 formed with a hollow hole, a second main body 17 formed with a hollow hole and small-diameter portions at both ends in an axial direction of the valve 1 and a female screw portion 17a in an inner peripheral surface defining the hollow hole, a third main body 18 formed with a hollow hole, and a forth main body 19, the main bodies 15,17-19 being stacked one on another.

In the hollow hole of the first main body 15, a handle rod 14 is inserted from below to a position where a shoulder 14b of the handle rod 14 comes into contact with the first body 15. A stopper ring 32 is attached to the handle rod 14, thereby holding the handle rod 14 rotatably with respect to the first main body 15.

A handle core 12 is fitted an upper end portion of the handle rod 14 protruding from the first main body 15.

As shown in FIG. 7, the handle core 12 is fixed to the handle rod 14 by a stopper screw 34. Also, as shown in FIG. 1, the handle 11 having a rectangular parallelepiped shape is fixed to the handle core 12 by a screw 13. Further, an 0 ring 33 is attached to an outer periphery of the handle rod 14.

The handle rod 14 is formed, on its bottom end, with an engagement protrusion 14a shaped like a parallel key, as shown in FIG. 7.

In the hollow lower part of the first main body 15, an upper small-diameter portion 17c of the second main body 17 is inserted and fixed by a stopper screw 35. An inner peripheral surface defining the hollow of the second main body 17 is formed with the female screw portion 17a. As shown in FIG. 4, a lower small-diameter portion 17d of the second main body 17 is formed, in its outer periphery, with a male screw portion 17b engaged with a female screw portion 18a formed in a hollow large-diameter portion 18c of the third main body 18. Also, as shown in FIG. 1, a male screw portion 18b is formed in an outer periphery of a small-diameter portion 18d of the third main body 18 and engaged with a female screw portion 19a formed in an upper part of an inner periphery of the fourth main body 19.

The female screw portion 17a engages, or meshes, with a male screw portion 16a formed in a circumstance of a screw member 16 configured to move in an axial direction (up and down directions) in association with rotation of the manual handle 11. Each of the female screw portion 17a and the male screw portion 16a is designed to have a pitch of 6 mm and to move 1.5 mm for each 90°-rotation of the handle 11.

In the top surface of the screw member 16, a recessed groove 16c is formed. In this recessed groove 16c, the engagement protrusion 14a of the handle rod 14 is engaged.

Under the screw member 16, a valve rod member 20 is held slidably in the axial direction (up and down directions) by a bush 40 fixed on an inner peripheral surface of the second main body 17.

A lower part of the screw member 16 is formed with a T slot 16b including a pair of projecting portions 16d at an open end (a lower end). In the T slot 16b, a top part 20a formed in the upper part of the valve rod member 20 is engaged. The top part 20a is provided by a small-diameter portion 20b formed in the valve rod member 20. The projecting portions 16d of the screw member 16 enter in and engage with the small-diameter portion 20b of the valve rod member 20.

The depth of the T slot 16b is bigger than the thickness of the top part 20a. In the embodiment, as shown in FIG. 4, the depth of the T slot 16b is larger by a distance W1=0.3 mm than the thickness of the top part 20a.

In the state of FIG. 1 (the valve open state), upper surfaces 16dx of the projecting portions 16d at the lower end of the T slot 16b contact with the lower surface 20ay of the top part 20a. Accordingly, the screw member 16 lifts or pulls upward the valve rod member 20.

In the state of FIG. 4 (the first cutoff state), the upper surfaces 16dx of the projecting portions 16d at the lower end of the T slot 16b are about to separate from the lower surface 20ay of the top part 20a.

In the state of FIG. 7 (the second cutoff state), the upper surfaces 16dx of the projecting portions 16d at the lower end of the T slot 16b are fully separated from the lower surface 20ay of the top part 20a, and a bottom surface 16bx of the T slot 16b comes into contact with an upper surface 20ax of the top part 20a from above in the axial direction.

In the lower part of the valve rod member 20, a spring holder 41 is supported by a penetrating pin 23. An upper surface of the spring holder 41 contacts with a lower surface of an urging spring 24. An upper surface of the urging spring 24 contacts with a bottom surface of a groove 17e formed in an underside of the second main body 17. The urging spring 24 urges the valve rod member 20 in a direction to press against a valve seat member 29.

Under the valve rod member 20, a valve element 22 is held slidably in up and down directions by a guide member 21. This guide member 21 is fixedly held between the third main body 18 and the forth main body 19. The guide member 21 holds a peripheral edge portion of a valve element thin plate 36 on the fourth main body 19. The valve element thin plate 36 is a spring plate made of cobalt alloy with a thickness of 0.1 mm and urges the valve element 22 in a direction to make the valve element 22 separate from the valve seat member 29.

In the center of a lower surface of the fourth main body 19, an input port 30 opens. In a position off the center, an output port 31 opens. In a position surrounding the input port 30, the valve seat member 29 is placed. In the present embodiment, the valve seat member 29 is made of PCTFE (trifluoroethylene).

On the other hand, as shown in FIG. 1, a padlock hole 38 is formed as a through hole in a side surface of the first main body 15 having a squire cross section. The first main body 15 includes a lock pin hole 43 extending from an upper surface of the first main body 15 to the padlock hole 38. A rod-like lock pin 26 is held slidably in up and down directions in the lock pin hole 43. The lock pin 26 is urged downward by a lock pin spring 28 attached to a spring holder 37. At a middle position of the lock pin 26, a pin 27 is partly embedded so that one end of the pin 27 protrudes out from an opening of the lock pin hole 43 to keep the lock pin 26 from rotating. The pin 27 also serves to allow an operator to apply force to the lock pin 26.

The screw member 16 corresponds to one example of a "moving member" of the invention. The urging spring 24 corresponds to one example of an "urging member" of the invention. The valve rod member 20 corresponds to one example of an "engagement member" of the invention.

The operations of the above manual opening/closing valve 1 will be explained. FIGS. 1, 2, and 3 show the valve opening state in which the handle 11 is located in a parallel position in FIG. 3. In the normal production process of semiconductors, the manual opening/closing valve is used in the valve opening state.

In the open valve state, the screw member 16 is at an uppermost position. The upper surfaces of the projecting portions 16d of the screw member 16 contact with the lower surface of the top 20a of the valve rod member 20, thereby pulling the valve rod member 20 upward by compressing the urging spring 24. Accordingly, a lower end surface of the valve rod member 20 does not contact with an upper end surface of the valve element 22. The valve element 22 is moved upward by the spring force of the valve element thin plate 36, and the valve element think plate 36 is also separated from the valve seat member 29. Thus, the input port 30 and the output port 31 are communicated with each other.

Next, explanation is given to a case where an operator operates the manual opening/closing valve 1 into a valve closed state during normal operation. As shown in FIG. 6, the operator first rotates the handle 11 clockwise to a position between a first angle θ1, 70 degrees in the present embodiment, to a second angle θ2, 90 degrees in the present embodiment, for example, to a position of 80 degrees, and then releases his/her hand from the handle 11. FIG. 4 shows the first cutoff state in which the operator has rotated the handle 11 to the first angle θ1=70 degrees.

When the handle rod 14 is rotated to the first angle θ1=70 degrees, the screw member 16 engaged with the engagement protrusion 14a also rotates clockwise to the first angle θ1=70 degrees. When the screw member 16 rotates 70 degrees, the screw member 16 moves downward by 70/360 of a pitch P=6.0 mm, namely, 6×70/360=1.7 mm.

This state shows the timing when the upper surfaces of the projecting portions 16d of the screw member 16 are about to separate from the lower surface of the top part 20a of the valve rod member 20.

When the operator rotates the handle 11 to an angular position of an angle θ=80 degrees (not shown), the upper surfaces of the projecting portions 16d of the screw member 16 are fully separated from the lower surface of the top part 20a of the valve rod member 20. The valve rod member 20 is thus urged by the urging spring 24 in the direction to make the valve element 22 contact with the valve seat member 29.

Specifically, the valve element 22 makes the valve element thin plate 36 contact with the valve seat member 29. Accordingly, the communication between the input port 30 and the output port 31 is cutoff. In the first cutoff state, when the handle 11 is set, or rotated, to an angular position between in the first angle θ1=70 degrees and the second angle θ2=90 degrees, for example to an angular position of 80 degrees, a contact load is set by the urging force of the urging spring 24 and thus the contact load can be made stable. Therefore, for example, even when another operator or other person touches the handle 11 accidentally and the handle 11 is rotated 2 to 3 degrees, as long as the handle 11 is disposed beyond an angular position of 70 degrees, the spring force of the urging spring 24 urges the valve element 22 in the direction to press against the valve seat member 29, so that the fluid does not leak.

The above first cutoff state is sufficient for the normal communication cutoff. However, during a maintenance work in which the pipes and others are removed, for example, if the regulator for the gas cylinder is broken, the maximum pressure, about 20 MPa, of the gas cylinder may be directly applied to the input port 30. In this case, the fluid may leak to the output port 31 because the urging force of the urging spring 24 cannot stand the pressure of 20 MPa. In the semiconductor production process using process gas high risk to human bodies, if such a fluid leaks, the operator's safety is concerned.

In this embodiment, when the maintenance work is to be carried out, the handle 11 is positioned at the second angle θ2=90 degrees as shown in FIG. 10. The second cutoff state at the time is explained with FIG. 7.

The male screw portion 16a of the screw member 16 and the female screw portion 17a of the second main body 17 threadedly engage each other. In the second cutoff state, therefore, the valve element 22 is made to contact with the valve seat member 29 by reaction force resulting from the treaded engagement. Further, the urging force of the urging spring 24 acts in the direction to bring the valve element 22 into contact with the valve seat member 29.

The screw member 16 and the second main body 17 are designed so that the reaction force resulting from the threaded engagement when the handle 11 is positioned in the second angle θ2=90 degrees enables the vale element 22 and the valve element thin plate 36 to contact with the valve seat member 29 than a predetermined force or more to prevent the fluid from leaking even if the fluid of the pressure about 20 MPa flows in the inlet port 30. The above design was experimentally confirmed that no fluid leakage was found even when a fluid pressure of about 20 MPa was applied for more than 72 hours. At this time, when the handle 11 is rotated to the second angular position, this rotating operation force applied to the handle 11 is converted to cutoff load (a force for moving the valve element 22 into contact with the valve seat member 29) to be applied to the valve seat member 29, thus enabling selection of a cutoff state with a higher load than that in the first cutoff state. Accordingly, a flow of the fluid is reliably cut off. In the second cutoff state, the screw member 16 directly presses the valve element 22 onto the valve seat member 29 through the valve rod member 20 in addition to the urging force. Thus, in case the fluid pressure abnormally rises, for example, the fluid is reliably cut off.

When the handle 11 is positioned in the second angular position, that is, at the second angle θ2=90 degrees, the resin valve seat member 29 may be plastically deformed a little because the valve element 22 presses the valve seat member 29 with strong force. However, it was experimentally confirmed that an amount of the plastic deformation was so small as not to cause any problem.

As shown in FIGS. 9 and 10, when the handle 11 is positioned at the second angle θ2=90 degrees, a pressing part 39a of a lock pin retainer 39 formed at the lower end of the handle core 12 is in a position just separated from the top of the lock pin 26.

When assembling the manual opening/closing valve 1, an operator checks, based on the rotation torque of the screw member 16, that the valve element 22 and valve element thin plate 36 are in contact with the valve seat member 29 with the predetermined force (the force enabling holding the valve element 22 and the valve thin plate 36 against separation from the valve seat member 29 even if a pressure of about 20 MPa is applied to the input port 30), and then fixes the position of the handle 11 in that state.

In that state of the handle 11, the operator is allowed to protrude the lock pin 26 from the upper end surface of the first main body 15 by pushing up the pin 27 by his/her fingers. When the lock pin 26 is protruded out so that the lower end of the lock pin 26 is moved out of the padlocking hole 38, allowing the operator to attach the padlock (not shown) in the hole 38. Thus, the handle 11 is locked in the second angular position.

Therefore, since the handle 11 of the manual opening/closing valve 1 cannot be rotated as far as the padlock is taken off, the safety of the operator can be secured during the maintenance work.

As mentioned above, the manual opening/closing valve in the embodiment has the following advantages. (1) The cutoff state includes the first cutoff state established when the handle 11 is rotated to the first angle θ1=70 degrees and the second cutoff state established when the handle 11 is rotated to the second angle θ2=90 degrees at which rotation operation force to the handle 11 is converted to the cutoff load to be applied to the valve seat element 29. With the above configuration, rotating the handle 11 to the first angle θ1=70 degrees places the valve 1 in a cutoff state quickly, and further rotating the handle 11 to the second angle θ2=90 degrees applies a cutoff load converted from the rotating operation force of the handle 11 to the valve element 22 and the valve element thin plate 36 (the valve seat member 29). Therefore, the rotation angle contributing to the cutoff state provide ranges and enables selection of a cutoff state with a higher load, so that it is possible to reliably cutoff the fluid.

(2) The manual opening/closing valve includes the screw member 16 configured to move in an axial direction in association with rotation of the handle 11, the urging spring 24 urging the valve element 22 in a direction to contact with the valve seat member 29, and the valve rod member 20 engaging with the screw member 16, the valve rod member 20 being formed integrally with or placed contacting in contact with the valve element. When the handle 11 is rotated to the first angle θ1=70 degrees, the screw member 16 and the valve rod member 20 are released from a contact state in up and down directions, and when the handle 11 is rotated to the second angle, the moving member contacts with the engagement member above in the axial direction. With the above configuration, in the first cutoff state, in a range between the first angle θ1 and the second angle θ2, the contact load is set by the urging force of the urging spring 24, thus the contact load can be made stable. Therefore, even if the handle 11 is rotated a little by the operator who accidentally touches the handle 11, this rotation has no influence on a normal sealing force. In the normal operation except for maintenance work, when the operator rotates the handle 11 to an angular position between the first angle θ1 and the second angle θ2, the valve element 22 is made to contact with the valve seat member 29 by only the urging force of the urging spring 24, so that sufficient sealing strength can be obtained and the valve seat member 29 is less likely to be deformed.

Moreover, in the second cutoff state, the valve element 22 is directly pressed onto the valve seat member 29 through the valve rod member 20 by the screw member 16 in addition to the urging force a flow of the fluid is cut off certainly even if the pressure of the fluid become unusually high. During a maintenance work, when the operator rotates the handle 11 to another angular position at the second angle θ2=90 degrees, the valve element 22 is made to contact with the valve seat member 29 by a predetermined screw force. Thus, gas leak is less likely to occur if the valve element 22 is subjected to a large gas pressure.

(3) The screw member 16 engages with the female screw part 17a of the second main body 17, the valve element 22 is moved into or out of contact with the valve seat member 29 through the valve element thin plate 36, and the valve element thin plate 36 is a metallic diaphragm configured to urge the valve element 22 in a direction to move away from the valve seat member 29. With the above configuration, rotating movement of the handle 11 is converted to linear movement in the up and down direction by engagements of the screw portions 16a and 17a. Moreover, since a return mechanism for the valve element 22 employs a restoring power of the metallic diaphragm 36, no additional return mechanism needs be provided. Accordingly, it is possible to reduce the number of parts or components of the valve 1.

(4) The valve in the second cutoff state cuts off a fluid of the same pressure as pressure of the fluid supply resource to which the valve is connected. With this configuration, for example, even in the case that a high pressure of the high pressure gas cylinder reaches, without being reduced, to the manual opening/closing valve 1 due to defects of pressure control machines, etc., or in the case that the manual opening/closing valve 1 is directly subjected to the maximum gas pressure due to breakage of the regulator for the gas cylinder while pipes are removed for maintenance, the gas leak is not caused in the manual opening/closing valve 1, thus enabling ensuring the safety of the operators.

(5) A lock mechanism to lock the handle 11 against rotation is configured to lock the handle 11 in the second cutoff state. Accordingly, the lock mechanism can prevent the handle 11 from rotating even when the operator touches the handle 11 accidently. Moreover, this locked state of the handle 11 reminds the operator that the handle 11 should not be operated carelessly.

Further, an operator is required to close and lock the manual valve during maintenance. However, unless the handle 11 is rotated beyond the second angle, the lock mechanism is not activated to lock the manual valve. This can ensure the operator to certainly rotate the handle 11 to the second angle.

When assembling the manual opening/closing valve 1, an operator checks, based on the rotation torque of the screw member 16, that the valve element 22 is in contact with the valve seat member 29 with the predetermined force, and then fixes the position of the handle 11 in that state. Thus, the predetermined screw force contributing to activation of the lock mechanism can be reliably ensured.

(6) The first angle is 70 degrees and the second angle is 90 degrees. Accordingly, in the normal operation, when the operator sets the position of the handle 11 between 70 degrees to 90 degrees, for example 80 degrees, even if someone touches the handle 11 accidently and the handle 11 is rotated a little, this rotation is less likely to influence the normal sealing strength.

The present invention is not limited to the above-described embodiment and may be embodied in other specific forms without departing from the essential characteristics thereof. For example, in the above embodiment, the first angle is 70 degrees and the second angle is 90 degrees, however, the angles may be set to any arbitral angles; e.g., the first angle is 90 degrees and the second angle 120 degrees.

For example, in the above embodiment, the screw system is used for converting rotational movement of the manual handle to linear movement of the moving member. As an alternative, a cam system also may be employed.

For example, in the above embodiment, the padlock is used as a lock holding mechanism, however, any other mechanism such as bars or chains etc. also may be used.

For example, in the embodiment, the valve rod member 20 is provided separately from the valve element 22. As an alternative, the valve rod member 20 and the valve element 22 may be formed as a single component.

Figure 11:
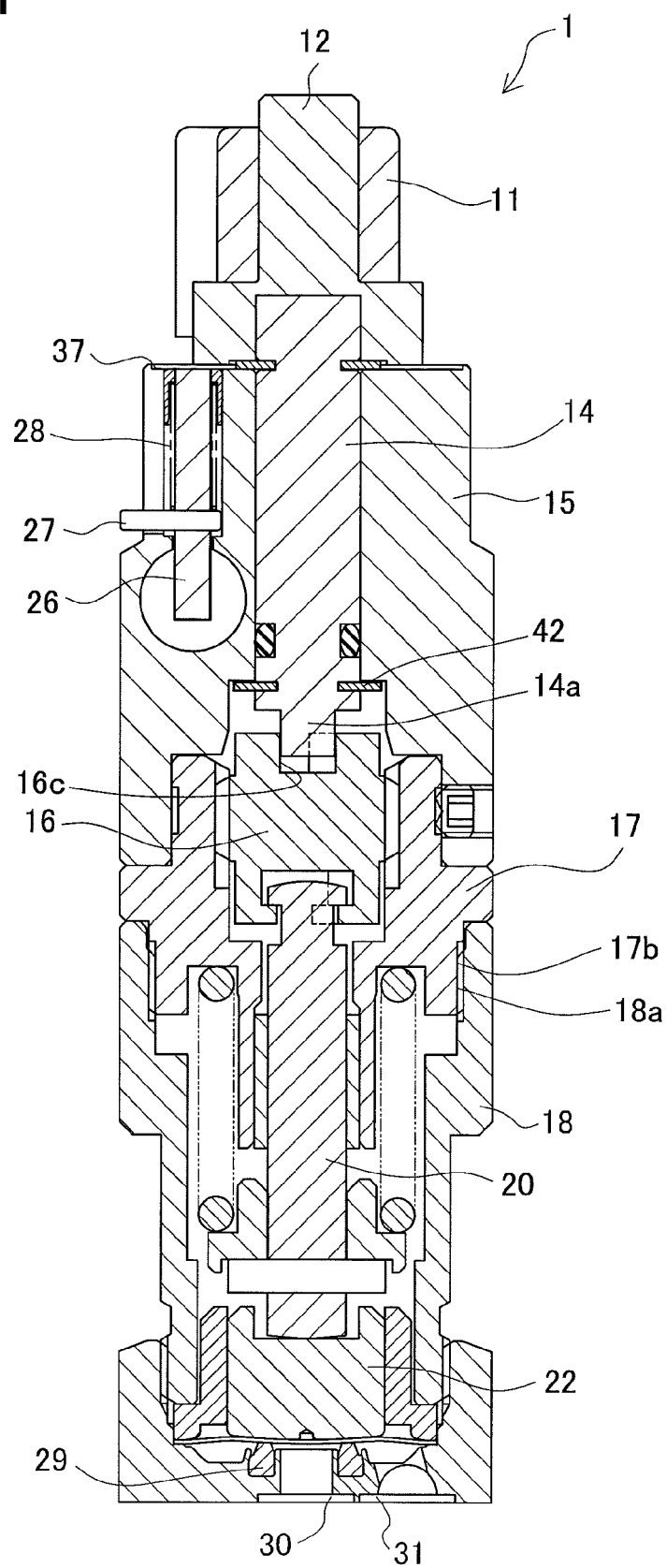
FIG. 11 is a sectional view of another embodiment of the manual opening/closing valve.

For example, in the embodiment, the shoulder 14b of the handle rod 14 contacts with the lower surface of the first main body 15. As an alternative, as shown in FIG. 11, a stopper ring 42 may be attached to the handle rod 14. This configuration only needs to be formed with a groove to attach the stopper ring 42 to the handle rod 14 and thus can shorten the machining time and reduce the cost.

While the presently preferred embodiment of the present invention has been shown and described, it is to be understood that this disclosure is for the purpose of illustration and that various changes and modifications may be made without departing from the scope of the invention as set forth in the appended claims.

REFERENCE SINGS LIST

1 Manual opening/closing valve
11 Handle
16 Screw member
16a Male screw portion
16b T slot
16d Projecting portion
17 Second main body
17a Female screw portion
20 Valve rod member
20a Top part
20b Small-diameter portion
22 Valve element
24 Urging spring
29 Valve seat member
36 Valve element thin plate

What is claimed is:

1. A manual opening/closing valve, comprising:
a manual handle;
a valve element;
a valve seat;
an input port;
an output port;
a moving member configured to move in an axial direction in association with rotation of the manual handle;
an urging member urging the valve element in a direction to contact with the valve seat;
an engagement member engaging with the moving member, the engagement member being formed integrally with or placed in contact with the valve element; and
a valve main body formed with a female screw part in an inner periphery,
wherein:
the manual opening/closing valve being arranged to move the valve element into contact with the valve seat when the manual handle is rotated, so that the valve is placed in a cutoff state in which communication between the input port and the output port is cut off,
the moving member engages with the female screw part of the valve main body,
the valve element is moved into or out of contact with the valve seat through a valve element thin plate,
the valve element thin plate is a metallic diaphragm configured to urge the valve element in a direction to move away from the valve seat,
the cutoff state includes a first cutoff state established when the manual handle is rotated to a first angle and a second cutoff state established when the manual handle is rotated to a second angle at which rotation operation force to the manual handle is converted to a cutoff load to be applied to the valve seat,
in the second cutoff state, the moving member contacts the engagement member, which thereby presses the valve element onto the valve seat,
when the manual handle is rotated to the first angle the moving member and the engagement member are released from contact in up and down directions, and
when the manual handle is rotated to the second angle, the moving member contacts with the engagement member from above in the axial direction.

2. The manual opening/closing valve according to claim 1,
wherein the valve in the second cutoff state cuts off a fluid of the same pressure as pressure of a fluid supply resource to which the valve is connected.

3. The manual opening/closing valve according to claim 2,
wherein a lock mechanism to lock the manual handle against rotation is configured to lock the manual handle in the second cutoff state.

4. The manual opening/closing valve according to claim 2,
wherein the first angle is 70 degrees and the second angle is 90 degrees.

5. The manual opening/closing valve according to claim 1,
wherein a lock mechanism to lock the manual handle against rotation is configured to lock the manual handle in the second cutoff state.

6. The manual opening/closing valve according to claim 5,
wherein the first angle is 70 degrees and the second angle is 90 degrees.

7. The manual opening/closing valve according to claim 1,
wherein the first angle is 70 degrees and the second angle is 90 degrees.

* * * * *